(12) United States Patent
Shepard et al.

(10) Patent No.: US 7,921,409 B2
(45) Date of Patent: Apr. 5, 2011

(54) MANAGED ADD-IN FRAMEWORK PROXY GENERATION

(75) Inventors: John A. Shepard, Seattle, WA (US); Nirav Y. Shah, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1256 days.

(21) Appl. No.: 11/365,553

(22) Filed: Feb. 28, 2006

(65) Prior Publication Data

US 2007/0234312 A1    Oct. 4, 2007

(51) Int. Cl.
*G06F 9/44* (2006.01)
*G06F 9/46* (2006.01)

(52) U.S. Cl. ........ 717/108; 717/120; 719/316; 719/330; 719/332

(58) Field of Classification Search ........................ None
See application file for complete search history.

(56) References Cited

U.S. PATENT DOCUMENTS

| 5,732,270 | A  | * | 3/1998 | Foody et al. | 719/316 |
|---|---|---|---|---|---|
| 6,883,172 | B1 | * | 4/2005 | Angeline et al. | 719/315 |
| 7,171,672 | B2 | * | 1/2007 | Just | 719/330 |
| 7,325,240 | B2 | * | 1/2008 | Yamamoto et al. | 719/330 |
| 2004/0111730 | A1 | * | 6/2004 | Apte | 719/330 |
| 2005/0149914 | A1 | * | 7/2005 | Krapf et al. | 717/136 |
| 2005/0216917 | A1 | * | 9/2005 | Krishnaswamy et al. | 719/315 |

OTHER PUBLICATIONS

U.S. Appl. No. 11/167,728, filed Jun. 27, 2005, Quinn.

* cited by examiner

*Primary Examiner* — Michael J Yigdall
(74) *Attorney, Agent, or Firm* — Woodcock Washburn LLP

(57) ABSTRACT

A Managed Add-in Framework (MAF) proxy generation tool comprises a library analyzer module operable for taking as input either a type library or managed software code assembly of the existing host application, and a proxy code generation module. Also, an additional input XML file that describes changes that a user would like to be made may be received by the tool and data acquired form the inspection of the additional input XML file and the inspection of the other inputs is merged and used to create the code of the proxy to the host object model. The proxy to the host's object model conforms to requirements of the MAF.

20 Claims, 8 Drawing Sheets

| OLE Types | |
|---|---|
| bool | System.Int32 |
| char, small | System.SByte |
| short | System.Int16 |
| long, int | System.Int32 |
| Hyper | System.Int64 |
| unsigned char, byte | System.Byte |
| wchar_t, unsigned short | System.UInt16 |
| unsigned long, unsigned int | System.UInt32 |
| unsigned hyper | System.UInt64 |
| float | System.Single |
| double | System.Double |
| VARIANT_BOOL | System.Boolean |
| void * | System.IntPtr |
| DWORD | System.Int32 |
| HRESULT | System.Int16 |
| SCODE | System.Int32 |
| BSTR | System.String |
| LPSTR or [string, ...] char * | System.String |
| LPWSTR or [string, ...] wchar_t * | System.String |
| VARIANT | System.Object |
| DECIMAL | System.Decimal |
| DATE | System.DateTime |
| GUID | System.Guid |
| CURRENCY | System.Decimal |
| SAFEARRAY(type) | managedType[] |

Fig. 6

```
public IDrawing Open(string FileName)
{
    object[] _paramFileName = new object[] {FileName};
    MethodInfo methodInfo = this.remoteType.GetMethod("Open",
        BindingFlags.Public | BindingFlags.InvokeMethod |
        BindingFlags.Instance | BindingFlags.Default,
        null, new Type[] { typeof(string) }, null);
    IDrawing retVal_paramFileName;
    retval_paramFileName = (IDrawing)methodInfo.Invoke(this, _paramFileName);
    return retval_paramFileName;
}
```

Fig. 7

MANAGED ADD-IN FRAMEWORK PROXY GENERATION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

BACKGROUND

Software for connecting information, people, systems, and devices such as Microsoft .NET (.NET) provides Extensible Markup Language (XML) based interoperability and is currently being incorporated across clients, servers, services, and tools. For example, products like Microsoft Windows® and Microsoft Office® will use .NET to connect with other systems and applications. For software developers, .NET is manifested in the programming model delivered in the Microsoft®.NET Framework. This framework is an integral Microsoft Windows® component that enables building and running the next generation of software applications and World Wide Web (Web) services. It includes technologies for Web services and Web applications, data access, smart client applications and many others.

As the .NET development community grows, the number of host applications, both Component Object Model (COM) based as well as .NET based, that wish to integrate automation models will grow. Moving forward, patterns have been established of using Managed Add-in Framework (MAF) for that integration. The MAF defines a programming model, built on top of .NET that allows applications to dynamically load and communicate with generic components at runtime. However, getting existing host applications to conform to the model required by the MAF would require a great deal of work on the part of the host integrator, potentially even forcing a rewrite of significant portions of the application itself.

Currently, there exists a minimal set of tools that allow COM host applications to generate wrappers that managed code can directly interact with. These tools are extremely limited and provide little ability for the user to correct, modify, add, and/or remove functionality that better serves the .NET developer community. Both COM and .NET host applications are also limited by the fact that they cannot generate wrappers that conform to the requirements of the Managed Add-in Framework (MAF).

Also allowing for hosts to create managed views of their COM automation models is problematic with respect to customizing the output. Historically, tools like type library importer (TLBIMP) have been used. However, TLBIMP produces a .NET assembly as its output which means that the integrator does not have an opportunity to customize the output. If this is a requirement for the integrator, they would then be forced to hand write their interop assembly or disassemble the output assembly, tweak the intermediate language (IL), and then reassemble the modified IL. Both of these options are quite expensive and can lead to further issues Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, Managed Add-in Framework (MAF) proxy generation is provided. For several embodiments, a method for facilitating integration of a host's software object model with a managed software code framework comprises generating a proxy to the host's object model wherein the proxy conforms to requirements of the managed software code framework. For example, the generating of a proxy comprises abstracting the host's object model and generating code of a proxy to the host's object model based on the proxy descriptor wherein the proxy exposes the host's object model.

Also, a proxy generation tool comprises a library analyzer module operable for taking as input either a type library or managed software code assembly of the existing host application and a proxy code generation module. The proxy code generation module is operable for generating a proxy to a host's object model based on output of the library analyzer module wherein the proxy conforms to requirements of a managed software code framework and exposes the host's object model.

Other advantages and features of the invention are described below.

BRIEF DESCRIPTION OF THE DRAWINGS

Managed Add-in Framework (MAF) proxy generation is further described with reference to the accompanying drawings in which:

FIG. 6 is a chart illustrating how ProxyGen maps types in a manner consistent with Microsoft® .NET Interop;

FIG. 7 illustrates an example of the generated code for a simple member of a generated proxy type.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Environments

Figure 1:
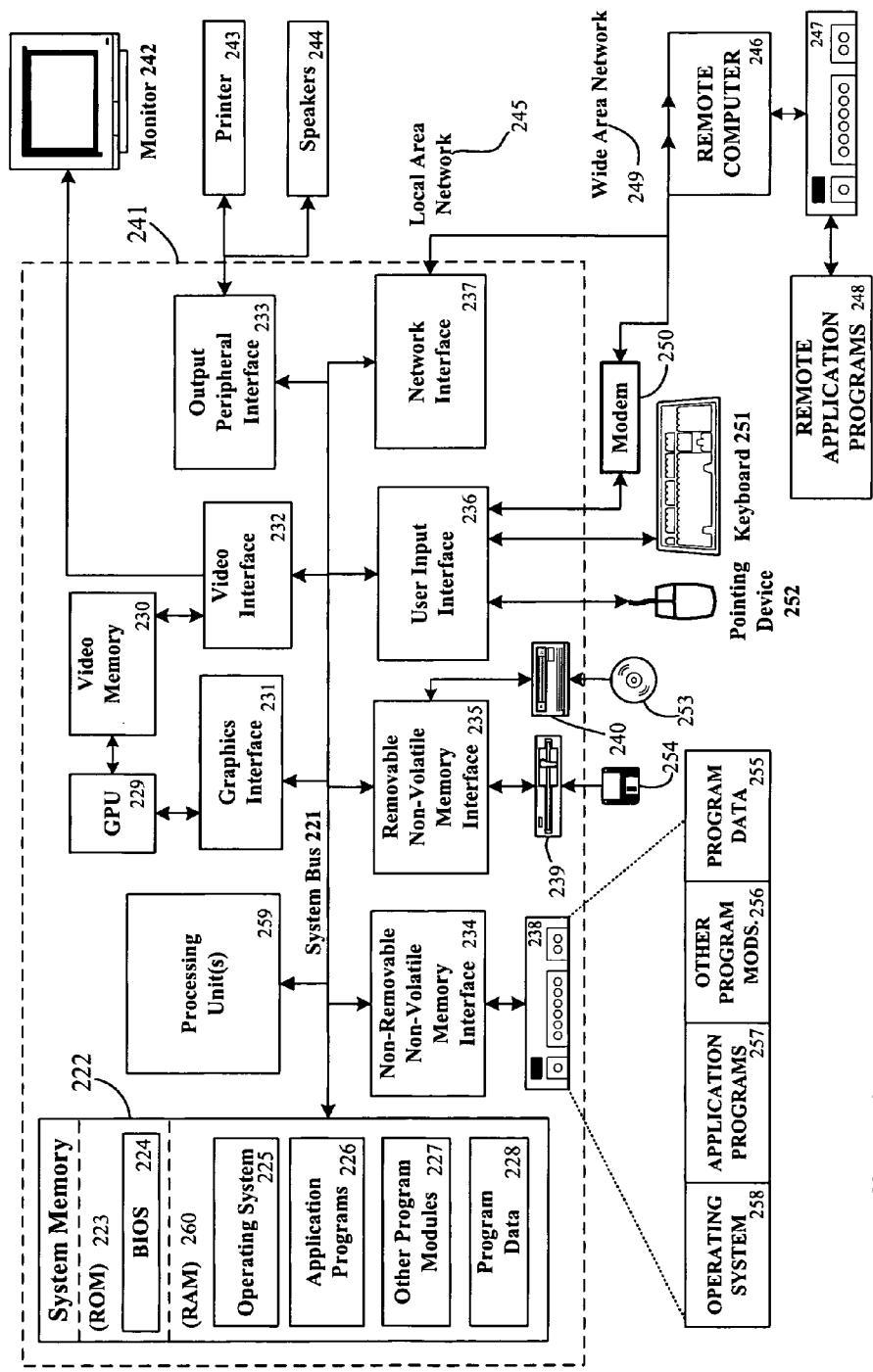
FIG. 1 is a block diagram representing an exemplary computing device suitable for use in conjunction with managed add-in framework proxy generation.

Referring to FIG. 1, shown is a block diagram representing an exemplary computing device suitable for use in conjunction with implementing the processes described above. For example, the computer executable instructions that carry out the processes and methods for managed add-in framework proxy generation may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
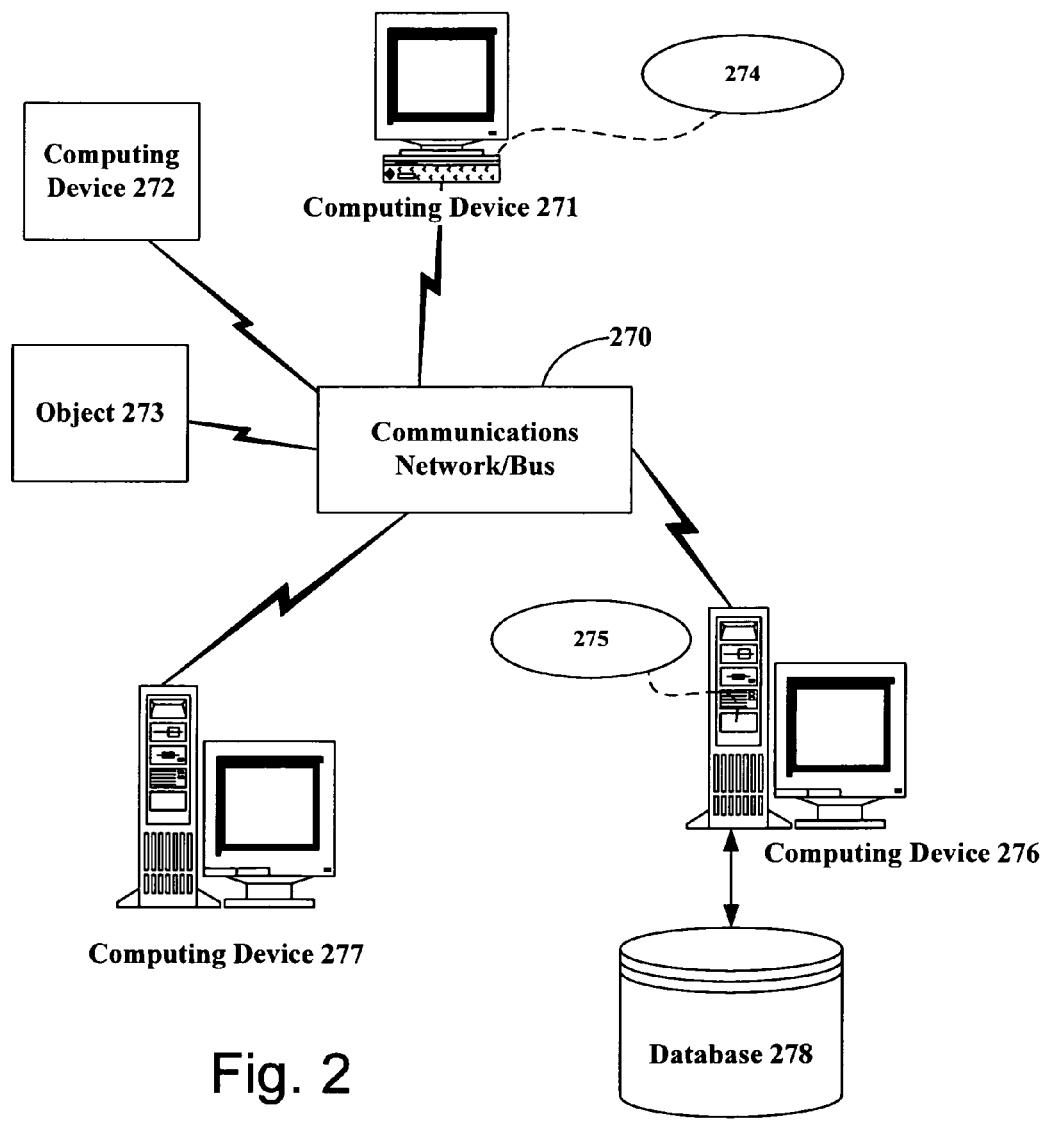
FIG. 2 illustrates an exemplary networked computing environment in which many computerized processes may be implemented to perform managed add-in framework proxy generation.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing managed add-in framework proxy generation. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the invention should not be limited to any single embodiment, but rather should be construed in breadth and scope in accordance with the appended claims.

Managed Add-in Framework (MAF)

The Managed Add-in Framework, or Managed Automation Framework (MAF) allows components in a computing system to version independently, isolate from one another, and dynamically bind to one another. MAF is also described in U.S. patent application Ser. No. 11/167,728 which is hereby incorporated by reference in its entirety. Using the MAF, components, such as an application and an add-in, are able to communicate with one another via a protocol in spite of not being version commensurate. Put another way, the add-in could be either a higher or a lower version of the application and still function with the application—and vice versa.

Furthermore, these components are also isolated by the MAF such that a given add-in can be seamlessly bound and unbound from an application without creating integration and disintegration problems. For example, an old version of an add-in can be removed from an application seamlessly because it is relatively isolated from the application—and yet it is able to communicate with the application. This kind of isolation may be provided by remoting boundaries.

Both the independent versioning and the isolation of the components allow for dynamic binding of one component to another component. Different versions of components may be bound to each other at any time (beyond build time) because of versioning capabilities and the provided isolation of the components that allows for seamless switching of components.

Thus, the MAF is used for communication between two or more independently versioning components, such as between an application and a software add-in. That is, while the components themselves may version, the protocol should not change. The protocol may be viewed as a specification or contract through which components communicate. This stable contract is a basis upon which the separately versioning components may continue to rely.

Figure 3:
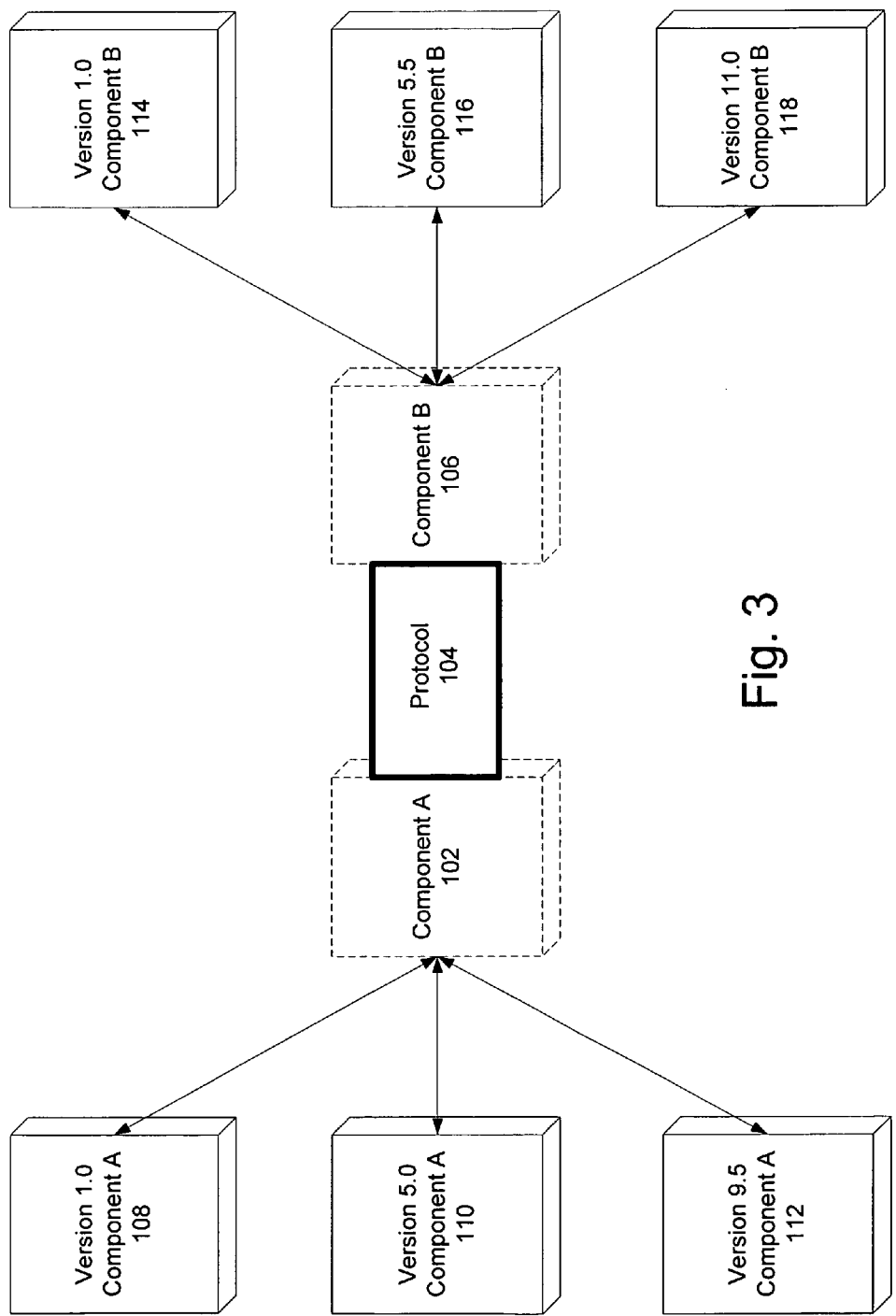
FIG. 3 illustrates a contract in the Managed Add-in Framework (MAF) and how is it used for communication between two or more independently versioning components.

Referring next to FIG. 3, shown is a contract in the Managed Add-in Framework (MAF) and how is it used for communication between two or more independently versioning components. As an example, FIG. 3 illustrates one aspect of independent versioning of the components. Two components are given: component A 102 and component B 106. These components communicate through a protocol 104. The two components 102 and 106 are illustrated in dashed lines to indicate that any of the other illustrated components, namely, components 108, 110, and 112 could take the place of component A 102, and components 114, 116, and 118 could take the place of component B 106. Thus, components A 102 and B 106 are just any generic components.

Having a protocol 104 that remains constant and does not necessarily change allows for different versions of the components to interact with one another—as long as these components recognize the protocol in question. Thus, for example, in a nominal case, version 1.0 of component A 108 can communicate through the protocol 104 with version 1.0 of component B 114. However, more importantly, different version numbers can also communicate. Thus, version 1.0 of component A 108 can also communicate with version 5.5 of component B 116 and version 11.0 of component B 118. Likewise, version 5.0 of component A 110 can communicate either with versions of other components that are either higher or lower than version 5.0 of component A 110: version 5.0 of component A 110 can communicate with version 1.0 of component B 114 or version 11.0 of component B 118.

Generally, using MAF, any two components, such as a host application and an add-in, can version independently from one another. This allows for better compatibility among components and ease of use when using such components in a computing framework such as .NET.

MAF Proxy Generation Tool (ProxyGen)

To alleviate the amount of work required for host applications to conform to the MAF, the MAF Proxy Generation Tool (ProxyGen) inspects existing host applications and generates libraries that conform to the MAF requirements. Since Proxy-Gen can interegate COM hosts, it provides the benefit of allowing for hosts to create managed views of their COM automation model. More specifically, ProxyGen allows for the integrator to customize the output that conforms to the MAF requirements by providing an XML description file that will help shape the output produced. In addition, if the XML schema is too restrictive, the integrator can customize the output itself very easily because ProxyGen will produce source code as its output rather than a .NET assembly directly ProxyGen simplifies the integration of a host's object model with MAF and provides a loose coupling between custom add-ins and the host application. A host object model is defined as being the core objects that an application provides for external consumption. These host objects must be either a COM object or a managed object.

Figure 4:
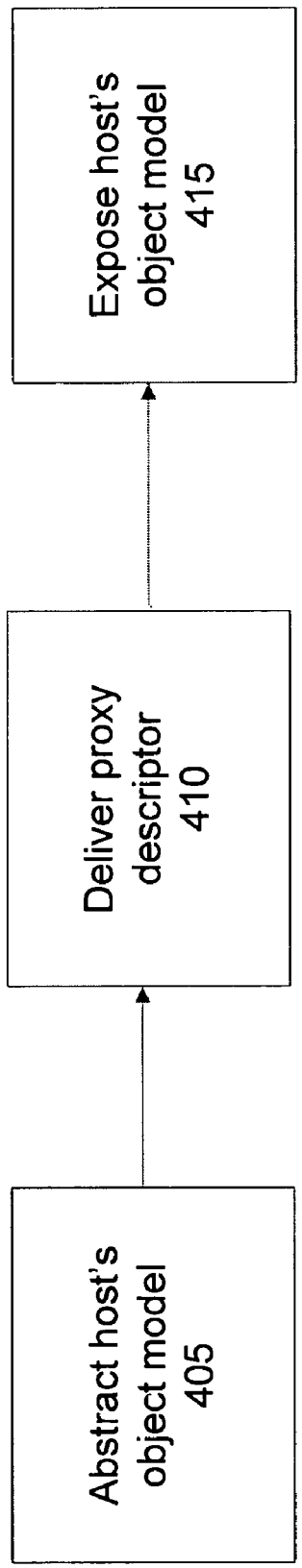
FIG. 4 illustrates a process of the MAF proxy generation tool (ProxyGen) to simplify the integration of a host's object model with MAF.

Referring next to FIG. 4, shown is a process of ProxyGen to simplify the integration of a host's object model with MAF. ProxyGen abstracts 405 a host's COM and/or .NET object model and delivers 410 an XML representation called a proxy descriptor (or simply descriptor) that ultimately results in a generated C# file called the proxy that exposes 415 the host's object model. The proxy code will in effect act as a proxy to the actual host object model. This abstraction will allow certain modifications to the object model as the end-users would see without touching the underlying host object model. ProxyGen (i.e., the tool) will also support the ability to synchronize a previously generated descriptor to a newer version of a host's object model thus preserving any changes. Modifications to the proxy descriptor are applied after processing the host object model.

The proxy code provides the loose coupling between add-ins and the host application. This loose coupling is done through the MAF. The loose coupling also provides for versioning, isolation and resiliency between the host application and other add-ins. The tool also supports a command line driven interface.

Figure 5:
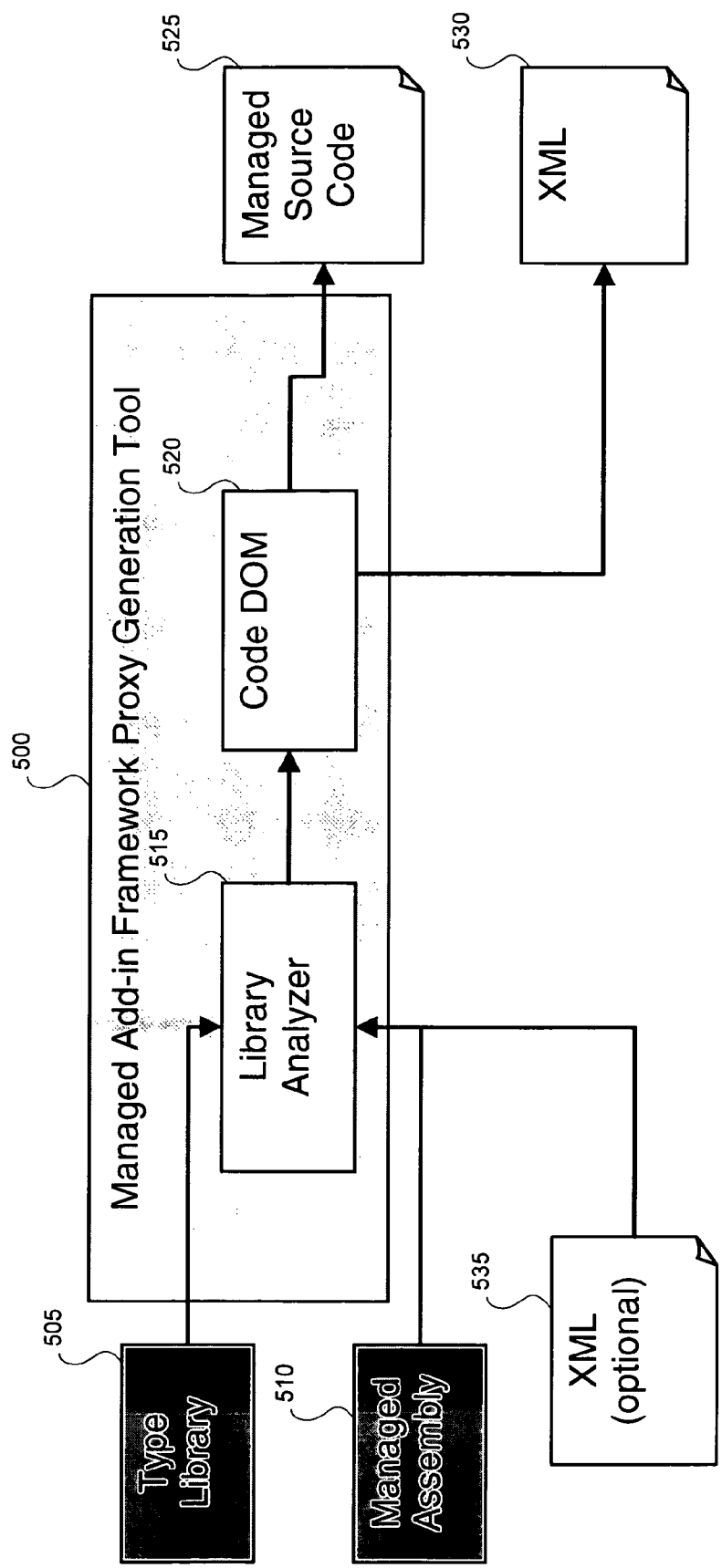
FIG. 5 is a block diagram illustrating an example system of ProxyGen.

Referring next to FIG. 5, shown is a block diagram illustrating an example system of ProxyGen. ProxyGen 500 takes as input either a COM Type Library 505, managed assembly 510 and/or an XML file 535 that describes changes that the user would like to be made that differ from the default generated output. ProxyGen 500 will then reflect 515 over the library provided as input 505 to determine the best way to represent its types and members in managed code. Depending on the command-line parameters passed to ProxyGen 500, it will generate 520 a proxy code file 525 and/or an XML proxy descriptor file 530.

Library Processing

Throughout the process of generating 500 the proxy 525 for a particular host object model, the integrator has the opportunity to modify the resulting proxy 525. As a result, the integrator can alleviate inconsistencies that exist between their model and user expectations, build more reliable programming models, and provide features that users have become accustomed to when developing with managed code.

There can be up to two inputs into ProxyGen 500: the actual host object model as a COM Type Library 505 or a managed class library 510 and/or an XML file 535 that describes changes that the user would like to be made that differ from the default generated output. Several parameters required to generate the best possible wrapper can be defined as inputs to the tool 500 on the command line or the input XML file 535 as well. The tool 500 will take all of these inputs and merge this data together 515, generating warnings and errors when necessary to inform the user of the possible issues that may exist in the generated output, proxy code file 525 and/or an XML proxy descriptor file 530.

COM Object Model

As mentioned earlier, one of the possible inputs into Proxy-Gen can be either a COM Type Library 505 or a managed class library 510 that describes an application's object model. For CbM Type Libraries 505, the following rules are applied to generate a MAF compliant proxy 525 that can communicate with the host object model using the generic MAF Intero-pAdapter.

As shown in the example below, the generated proxies' 525 namespace will default to the name of the library.

---

Generating the namespace of the proxy file based on the IDL library name.
IDL
library ShapeApp
{
    /* typelib information goes here */
}
Proxy Code C#
namespace ShapeApp {...}

---

ProxyGen 500 will generate 520 two types for a given COM interface. It will generate a managed interface as well as an "interface proxy class." The interface proxy class is created to allow objects to be instantiated if the underlying implementation is hidden. Because add-ins generally do not talk directly to the host object model, the actual implementation for that interface may not be instantiated directly. Instead, the proxy interface class serves as a surrogate class into the underlying MAF infrastructure.

---

-----IDL-----
interface IApplication : IDispatch
{
    [id(...)] HRESULT Initialize( );
};
--- Generated Proxy Code -----
interface IApplication
{
    void Initialize( );
}
class IApplicationClass
{
    void Initialize( )
    {
      /* Code to call into MAF and return a valid Contract for
        IApplication goes
here */
    }
}
In situations where one has interfaces inheriting from other interfaces, the interface proxy class will implement members from all interfaces explicitly except the interface that the interface proxy class directly derives from, which will be implemented implicitly.
-----IDL-----
Interface IApplication : IDispatch
{
    [id(...)] HRESULT Initialize( );
}
interface IApplication2 : IApplication
{
    [id(...)] HRESULT Initialize2( );
}
--- Generated Proxy Code -----

```
interface IApplication
{
    void Initialize( );
}
interface IApplication2 : IApplication
{
    void Initialize2( );
}
class IApplicationClass : IApplication
{
    void Initialize( ) { }
}
class IApplicationClass2 : IApplication2
{
    void IApplication.Initialize( ) { }
    void Initialize2( ) { }
}
```

Also, by explicitly implementing members one can avoid any name conflicts between interfaces having identical members. These interface proxy classes are not intended to be used by users. These classes will be marked with the EditorBrowsable and Browsable attributes. Hide methods decorated with [restricted] are ignored unless explicitly declared in the descriptor.

```
-----IDL-----
Interface IApplication : IDispatch
{
    [id(...)] HRESULT Initialize( );
}
interface IApplication2 : IApplication
{
    [id(...)] HRESULT Initialize2( );
}
--- Generated Proxy Code -----
interface IApplication
{
    void Initialize( );
}
interface IApplication2 : IApplication
{
    void Initialize2( );
}
class IApplicationClass : IApplication
{
    void Initialize( ) { }
}
class IApplicationClass2 : IApplication2
{
    void IApplication.Initialize( ) { }
    void Initialize2( ) { }
}
```

Members marked with the [restricted] attribute are by default ignored. This can be overridden by the ProxyGen 500 user with the use of the XML descriptor file. ProxyGen 500 generates a managed class definition for each CoClass of the Type Library 505 and implicitly implements its default interface and will expose any methods of the default source interface as events. Any other interfaces implemented by the CoClass are explicitly implemented.

```
interface IExplicit
{
    [id(...)] HRESULT DoSomething( );
};
interface IApplication : IDispatch
{
    [id(...)] HRESULT Initialize( );
};
dispinterface IApplicationEvents
{
    [id(...)] HRESULT ApplicationStartup( );
    [id(...)] HRESULT DrawingClosed(BSTR bstrDrawingName);
};
coclass CApplication
{
    [default] interface IApplication;
    [default, source] dispinterface IApplicationEvents;
};
public delegate void ApplicationStartupHandler( );
public delegate void DrawingClosedHandler(string bstrDrawingName);
public class CApplication : IApplication, IExplicit
{
    public event ApplicationStartupHandler
    public event DrawingClosedHandler DrawingClosed;
    public void Initialize( );
    public void IExplicit.DoSomething( );
}
```

For event interfaces, there is a possibility of a name conflict between a method on the event as well as a method in the [default] interface. While this is legal in COM, it is illegal to have an event and a method with the same name in .NET. If this is encountered, ProxyGen 500 will emit code with conflicting names. Users can resolve this conflict using the descriptor files to rename the conflicting members.

For source interfaces, a delegate will be created for each member of the in interface to act as the type for the generated event. COM enumeration types will be mapped to associated enumeration types in the generated proxy. ProxyGen 500 implements the necessary lifetime semantics to keep the proxied object alive across the remoting boundary and release the remote object when the proxy no longer needs to have access to the object being proxied.

Also, referring next to FIG. 6, shown is a chart illustrating how ProxyGen 500 maps types in a manner consistent with Microsoft® .NET Interop. For types that are mapped to System.Object or System.IntPtr, ProxyGen 500 emits a comment in the generated code to signify possible data loss for the user. Parameters with types with one additional level of pointer indirection are generated as a parameter that is to be passed by reference to the proxied object. Additionally, parameters that are marked as [in,out] in the COM Type Library 505 will also be marked as a parameter that is to be passed by reference. Parameters marked with the [out] attribute are generated as out only parameters in the generated proxy code 525. Parameters marked with the [retval] attribute will be mapped to become the return type of the target member with the appropriate mapped type (listed in FIG. 6).

Properties that do not have any parameters are generated as properties in the proxy 525. Properties that do have parameters are generated as methods in the proxy 525. Properties marked with the [propget] attribute will have a method generated with "get_" prepended to the property name to form the method name. Properties that are marked with the [propput] or [propputref] attribute will have a method generated with "put_" prepended to the property name to form the method name. The one exception to this is when the property is named "Item." In this case, the property becomes a .NET indexer with the specified parameters.

Any parameters that have default values specified in the Type Library have corresponding default values in the generated proxy 525. Any parameters that are marked as optional in the Type Library are marked as optional in the generated proxy 525. Implementations of IEnumVARIANT in the COM Type Library are converted to an implementation of IEnumerable in the generated proxy 525. The implementation of IEnumerable in the proxy will call into the underlying IEnumVARIANT implementation.

Managed Object Model

ProxyGen 500 supports the ability to have a managed assembly 510 that has multiple namespaces defined in it by generating 520 the proxy types in the same namespace as the underlying type by default. Types in the managed object model that are publicly visible have proxy types created for them with a visibly exact match to the underlying type. This includes classes, enumerations, delegates, and structs.

Any valid attribute declared on the underlying type is generated as part of the proxied type as well. Type inheritance is also carried forward to the generated proxy 525 so that two types maintain the same type hierarchy in the generated proxy 525 as the underlying object model. All interfaces in the host object model are wrapped by default. ProxyGen 500 also creates 520 a managed class that implements the generated interface to provide a implementation type that can be handed back in cases where the underlying object type is not publicly exposed.

XML Description File

ProxyGen 500 supports the ability to use a single XML file 535 to represent a COM Type Library 505 or a managed class library 535. If both a COM Type Library 505 or a managed class library 510 and the XML description file 535 are provided as input, the data acquired from inspecting both are merged and synchronized 515 to provide a complete description of the host object model. Optionally, the user can specify that ProxyGen 500 should generate an XML description 530 of the input COM Type Library 505 or managed class library 510.

If the optional XML file 535 is specified as an input, it must conform to the ProxyGen 500 XML Description file schema. If it does not, ProxyGen 500 may fail to generate proxies or properly synchronize or even execute. Using the XML Description file 535, users can modify the namespace for generated proxy types, hide any class member, rename any class member, rename any class member parameter, modify the type of a parameter or class member return type, and change the visibility of types and class members. Optionally, the XML Description File 535 author can add additional attributes to be included on the generated proxy types.

Outputs

Depending on the options specified by the user, several different things may be produced by ProxyGen 500. The first being an XML file 530 that describes the proxy that ProxyGen 500 intends to generate. If both the input library 505 and XML file 535 were specified as input, this file would include the merged results. This XML file 530 can then be edited by the integrator to modify the generation process which can then be fed back into ProxyGen 500 as the input XML file 535 that will be merged with the default library information 505.

The other output of ProxyGen 500 is MAF proxy source code 525. Using the data gathered from analyzing 515 the input library 505 and merging that with the data provided in the input XML file 535, the tool 500 builds a Code Document Object Model (DOM) 520 that represents the proxy code to generate. Based on the Code DOM 520 that is built up, source files are generated that represent the proxy types required for the host to be MAF compliant.

Each generated type has a similar structure where they aggregate the IRemoteObjectContract for the proxied object it represents and a static instance of the proxied type. Each generated member then has code generated within it that invokes the real member via .NET reflection against the proxied type where the IRemoteObjectContract that is aggregated is the target object. For each of these members, the parameters that are passed in are wrapped appropriately into an array of objects as expected by .NET reflection. After the invocation of the actual member, there is also code generated to copy back out any parameters that were passed by reference as out parameters to ensure that those values are propagated back to the caller of the code. Referring next to FIG. 7, shown is an example of the generated code 705 for a simple member of a generated proxy type.

Proxy Code Execution

Figure 8:
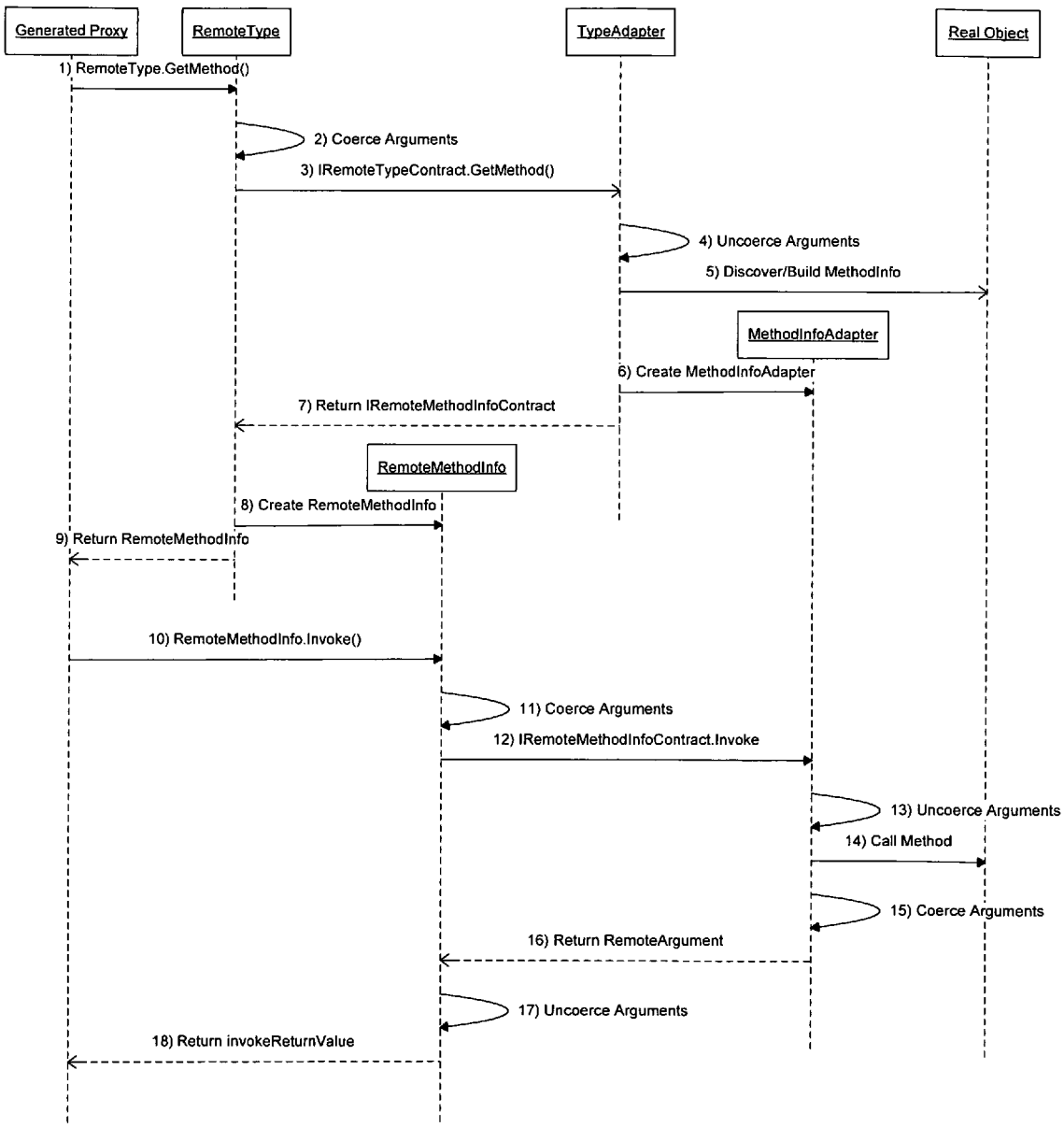
FIG. 8 a diagram outlining the activity of executing the proxy code example of FIG. 7.

Referring next to FIG. 8, shown is a diagram illustrating the activity of executing the proxy code example of FIG. 7. As an example, described below is what happens specifically in each step on the diagram of FIG. 8 and how it relates to the proxy code snippet provided in FIG. 7.

The first two lines of the generated proxy member implementation 705 shown in FIG. 7 causes the following sequence of events to occur:

1) The first step in invoking a member through the managed automation framework is to find the desired member to invoke. This is accomplished by using regular .NET reflection semantics. In the case of the sample code provided, the proxy wishes to invoke a method named "Open" on the proxied object. Hence, code will be generated that will invoke GetMethod on the proxy's reference to RemoteType (a proxy for IRemoteTypeContract that was initialized when the proxy was instantiated) that passes in the name of the underlying method, the appropriate binding flags to find the method, and the types of the parameters that that proxy wishes to pass in to ensure that the appropriate match is found. Since RemoteType derives from System.Type, the proxy is not required to map any of the GetMethod arguments to other types. If the proxy intended to invoke a property or add an event handler, it would generate similar code but it would instead call the appropriate methods on RemoteType that return instances Propertyinfo or EventInfo objects.

2) The call to GetMethod will now be handled by RemoteType because it derives from System.Type. However, before it can actually invoke the GetMethod method on the contract, it must first coerce any of the arguments it received into MAF compliant types meaning it must wrap any non-intrinsic types into contract implementations.

3) Once RemoteType has prepared its arguments for calling on the contract, it will actually call on the GetMethod method on the IRemoteTypeContract that it is aggregating.

4) The call to GetMethod on the IRemoteTypeContract will end up being handled by a Type Adapter that implements the IRemoteTypeContract. The adapter itself can be one of several different types depending on the type of the underlying host application. The first thing the Type Adapter will do is unwrap any arguments that were passed across the contract into a manner consumable for the underlying object. Essentially, this means that any contract implementations are unwrapped and the underlying real object is pulled out.

5) Once the Type Adapter has coerced the arguments into consumable values, it will then discover and/or build the method information for the method being requested. Again, because the underlying host application can be multiple types, the logic necessary to do this will differ greatly between different types of Type Adapters.

6) Using the information gathered from the underlying real object about the method being requested, the adapter will then build up a MethodInfo Adapter. Similar to the Type Adapter, the MethodInfo Adapter can have multiple different implementations, but is required to implement the IRemoteMethodInfoContract.

7) Once an instance of a MethodInfo Adapter has been created, this is returned to RemoteType as an instance of IRemoteMethodInfoContract.

8) RemoteType will take this instance of IRemoteMethodInfoContract and wrap that into a MethodInfo proxy—RemoteMethodInfo. RemoteMethodInfo derives from MethodInfo and aggregates an IRemoteMethodInfoContract.

9) RemoteType will then return this newly created instance of RemoteMethodInfo to the calling proxy.

The final three lines of the generated proxy member implementation 705 shown in FIG. 7 causes the following:

10) With a reference to a MethodInfo instance, the proxy code will next invoke it by calling the Invoke method. Again, the proxy will pass in the required arguments for invoking the method as a caller would normally do using .NET reflection.

11) Since the MethodInfo object that the generated proxy calls on is actually an instance of RemoteMethodInfo, the call to Invoke will be handled by it. When Invoke is called on RemoteMethodInfo, the first thing is does is take the object array it received as arguments and coerces it to types that are MAF compliant types. For method invocations, this is generally a collection of RemoteArguments that contain either contracts or intrinsic types.

12) Once the arguments have been appropriately coerced, RemoteMethodInfo will then call the Invoke method on the IRemoteMethodInfoContract that it is aggregating.

13) The call to Invoke on the IRemoteMethodInfoContract is handled by the MethodInfo Adapter that was created earlier. The MethodInfo Adapter must first uncoerce the arguments into types that it can use to properly invoke the underlying method. Again, depending on the type of the underlying host application, this coercion logic will be different.

14) Once the arguments are coerced into a useable form, the MethodInfo adapter will then actually invoke the underlying method that it represents.

15) Depending on the return type of the underlying method, it may or may not return a value. If the underlying method does in fact return a value, this value will be coerced into a form that is MAF compliant to send back across to the caller. In general, this means that if the type is an intrinsic type, it will be wrapped into a RemoteArgument and returned to the caller. If it is reference type, it will be wrapped into an appropriate adapter and returned to the caller as a RemoteArgument. Additionally, any parameters that were marked as parameters that were passed in by reference or as out only need to be coerced back into the collection of arguments that was passed into the contract.

16) Once the MethodInfo Adapter has coerced the arguments, it can return the method invocation's return value as the RemoteArgument that it created.

17) Once the call to the contract returns, the instance of RemoteMethodInfo will uncoerce the return value and array of arguments that were passed in copying out any parameters that were to be passed in by reference or as out only. If the return type is a contract, an appropriate proxy type is discovered for it and an instance of that proxy type is created and given the contract to aggregate.

18) Once the RemoteMethodInfo has uncoerced the arguments, it returns the uncoerced return value to the generated proxy code. Because reflection calls will return System.Object, if the generated proxy member has a return type that is stronger that System.Object, a cast operation will be generated for the return of the Invoke call. Furthermore, if the parameters are marked as parameters that are to be passed by reference or as out parameters (not shown in the sample code above), code will additionally be generated to copy the uncoerced values back out of the array of objects passed into the Invoke call into the parameters that were passed into the call.

MAF Conformance

With the advent of the Managed Add-in Framework, applications who wish to be customizable using managed code will have additional complexities that must be dealt with. Our invention will help reduce those complexities and provide for an expedited process that can be used to produce MAF conformant applications.

MAF defines contracts which are interfaces that never change, although additional contracts may be added from version to version. The interfaces are implemented by the host application and are consumed by a proxy. From version to version host applications can freely change the proxy as long as they continue to support the contracts and continue to release the old proxies. This ensures backward as well as forward compatibility.

ProxyGen 500 generates host proxy based on the information it can gather from the input library. This can be done regardless of whether the user provides XML input into the tool or not. The classes generated by the tool will provide rich .NET types that developers can work against. However, when calls are made to the generated proxies, those calls are actually then delegated out to a contract that the proxy has a reference to. The code generated will also provide the necessary mapping infrastructure so that when contracts are returned from delegated calls, those can be proxied appropriately. With this infrastructure, the developer writing code against the proxy is never aware of the complexity of the system that the code is working with. The developer gets to work against a model that is consistent with other .NET coding models.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, such as that shown in the figure below, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A computer-implemented method for facilitating integration of a host's software object model with a managed software code framework, comprising:
    the computer generating a proxy to the host's software object model wherein the proxy conforms to requirements of the managed software code framework, and wherein the managed software code framework provides an isolation between software components and allows dynamic binding of components at runtime; and
    a host integrator modifying the proxy during generation of the proxy using parameters from a parameter input file and parameters from a command line interface, wherein the parameters from the parameter input file and the parameters from the command line interface are merged.

2. The method of claim 1 wherein the step of generating a proxy comprises: abstracting the host's software object model and generating code of a proxy to the host's software object model based on a proxy descriptor wherein the proxy exposes the host's software object model.

3. The method of claim 2 wherein the step of abstracting the host's software object model comprises: inspecting an existing host application; and generating libraries that conform to the requirements of the managed software code framework.

4. The method of claim 3 further comprising the step of generating a proxy descriptor file based on the inspecting of existing host applications.

5. The method of claim 3 wherein the step of inspecting an existing host application comprises: taking as input either a type library or managed software code assembly of the existing host application; and determining how to represent the types and members of the existing host application in conformance with the requirements of the managed software code framework based on the input type library or managed software code assembly.

6. The method of claim 5 wherein the managed software code framework is a managed add-in framework (MAF).

7. A computer readable storage medium having instructions thereon for performing the steps of claim 1 when said instructions are processed by a processor.

8. A computer readable storage medium having instructions thereon for performing the steps of claim 2 when said instructions are processed by a processor.

9. A computer readable storage medium having instructions thereon for performing the steps of claim 3 when said instructions are processed by a processor.

10. A computer readable storage medium having instructions thereon for performing the steps of claim 4 when said instructions are processed by a processor.

11. A computer readable storage medium having instructions thereon for performing the steps of claim 5 when said instructions are processed by a processor.

12. A computer readable storage medium having instructions thereon for performing the steps of claim 6 when said instructions are processed by a processor.

13. A system for facilitating integration of a host's software object model with a managed software code framework comprising a memory and a processor executing software that, when processed, causes said processor to implement the steps of:
    generating a proxy to the host's software object model wherein the proxy conforms to requirements of the managed software code framework, and wherein the managed software code framework provides an isolation between software components and allows dynamic binding of components at runtime; and
    modifying the proxy during generation of the proxy using parameters from a parameter input file and parameters from a command line interface, wherein the parameters from the parameter input file and the parameters from the command line interface are merged.

14. The system of claim 13 wherein the step of generating a proxy comprises implementing instructions on said processor for abstracting the host's software object model and for generating code of a proxy to the host's software object model based on a proxy descriptor wherein the proxy exposes the host's software object model.

15. The system of claim 14 wherein abstracting the host's software object model comprises inspecting an existing host application and generating libraries that conform to the requirements of the managed software code framework.

16. The system of claim 15 further comprising implementing instructions on said processor for generating a proxy descriptor file based on the inspecting of existing host applications.

17. The system of claim 15 wherein the instructions for inspecting an existing host application further comprise instructions for taking as input either a type library or managed software code assembly of the existing host application and for determining how to represent the types and members of the host application in conformance with the requirements of the managed software code framework based on the input type library or managed software code assembly.

18. The system of claim 17 wherein the managed software code framework is a managed add-in framework (MAF).

19. A proxy generation tool comprising a processor executing software including a library analyzer module operable for taking as input either a type library or managed software code assembly of an existing host application, a proxy code generation module operable for generating a proxy to a host's software object model based on output of the library analyzer module, wherein the proxy conforms to requirements of a managed software code framework that provides an isolation between software components and allows dynamic binding of components at runtime and wherein the proxy exposes the host's software object model, and a host integrator configured to modify the proxy during generation of the proxy using parameters from a parameter input file and parameters from a command line interface, wherein the parameters from the parameter input file and the parameters from the command line interface are merged.

20. The tool of claim 19 wherein the managed software code framework is a managed add-in framework (MAF).

* * * * *